United States Patent [19]

Nevins et al.

[11] 4,278,866
[45] Jul. 14, 1981

[54] AUTOMATIC ELECTRON BEAM DEFLECTING CIRCUIT

[75] Inventors: Glenn T. Nevins, Muskegon; William A. Keely, Hesperia, both of, Mich.

[73] Assignee: Teledyne Industries, Inc., Los Angeles, Calif.

[21] Appl. No.: 637,889

[22] Filed: Dec. 5, 1975

[51] Int. Cl.$^3$ .............................................. B23K 9/00
[52] U.S. Cl. .................... 219/121 EC; 219/121 EW; 219/121 EU; 219/121 EX; 73/627
[58] Field of Search ................. 219/121 EM, 121 EB, 219/121 L, 121 LM, 125 PL, 121 P; 73/67.8, 69, 552, 67.5 R, 67.8 R, 522

[56] References Cited

U.S. PATENT DOCUMENTS

| | | | |
|---|---|---|---|
| 2,280,226 | 4/1942 | Firestone | 73/67.8 |
| 2,931,978 | 4/1960 | Erdman | 73/67.8 |
| 2,941,151 | 6/1960 | Goldbohm et al. | 73/67.8 X |
| 3,152,238 | 10/1964 | Anderson | 219/121 EB |
| 3,440,392 | 4/1969 | Erlandson et al. | 219/121 EB X |
| 3,518,400 | 6/1970 | Gallivan | 219/121 EM |
| 3,589,196 | 6/1971 | Passaic et al. | 73/67.8 X |
| 3,648,009 | 3/1972 | Steigerwald | 219/121 EM |
| 3,985,022 | 10/1976 | Dileo | 73/67.8 X |

FOREIGN PATENT DOCUMENTS 1905302 of 1970 Fed. Rep. of Germany .... 219/125 PL
147705 of 1962 U.S.S.R. .............................. 219/125 PL

OTHER PUBLICATIONS

Ultrasonic Thickness for Control of Machine Tools by Dr. Newman, 5-1972.

Primary Examiner—Arthur T. Grimley
Assistant Examiner—M. H. Paschall
Attorney, Agent, or Firm—Gifford, VanOphem, Sheridan & Sprinkle

[57] ABSTRACT

Apparatus for use in conjunction with a work piece positioned on a work table and having an interface spaced from the work table which is provided for controlling the impingement of the beam from an electron beam welder upon the interface. A search unit coupled to the work table both generates a sense wave pulse along the work piece and receives an echo from the work piece interface. A timing circuit is operatively coupled with the search unit and determines the elapsed time between the generation of the sense waves pulse and the receipt of the echo from the interface so that the elapsed time is representative of the distance of the interface from the work table. In response to the elapsed time determined by the timing circuit, a control unit generates electrical signals to a deflection coil magnetically coupled with the electron welder beam to position the beam so that the beam impinges upon the work piece interface.

7 Claims, 2 Drawing Figures

AUTOMATIC ELECTRON BEAM DEFLECTING CIRCUIT

BACKGROUND OF THE INVENTION

I. Field of the Invention

The present invention relates to an apparatus for automatically controlling the impingement of the beam from an electron beam welding gun on a work piece.

II. Description of the Prior Art

Conventional electron beam welding equipment of the type which emits a beam of electrons which impinge upon a work piece to form a weld are well known and generally accepted throughout many industries. With such equipment the welder gun must be "aimed" at the work piece so that the electron beam impinges upon the intended area.

Heretofore it has been the practice in the industry to manually aim the welder gun at the target. Such a procedure is not only time consuming, particularly when the wleder gun must be repositioned for each welding operation, but also in practice it has been found that the welder gun is often inaccurately positioned. Needless to say, inadequate welds result from an improperly aimed welder gun.

SUMMARY OF THE PRESENT INVENTION

The present invention obviates the above mentioned disadvantages of the prior art by providing apparatus for automatically aiming the electron beam from a welder gun. The apparatus of the present invention is intended for use with a work piece having an interface adapted to be welded wherein the work piece is mounted on a work table. A search unit, upon command, generates a sense wave pulse along the work piece and also includes means to receive the echo of the wave pulse from the interface.

A timing circuit is provided to measure the elapsed time from generation of the wave pulse to the receipt of the echo so that the elapsed time is representative of the distance from the search unit on the work table to the interface. A control unit responsive to the elapsed time then generates electric signals to a deflection coil magnetically coupled with the electron beam from the welder gun to deflect the beam to the work piece interface to perform the welding operation.

The apparatus of the present invention thus achieves substantial advantages over the previously known welding procedures by rapidly and automatically deflecting the electron beam to the proper target. Moreover, with the present invention, the electron beam can be precisely aimed for each and every welding operation thus eliminating the human error inherent in all manual operations.

BRIEF DESCRIPTION OF THE DRAWINGS

A better understanding will be had of the present invention upon reference to the following detailed description when read in conjunction with the accompanying drawing, wherein like reference characters refer to like parts throughout the several views, and in which.

DETAILED DESCRIPTION OF THE PRESENT INVENTION

Figure 1:
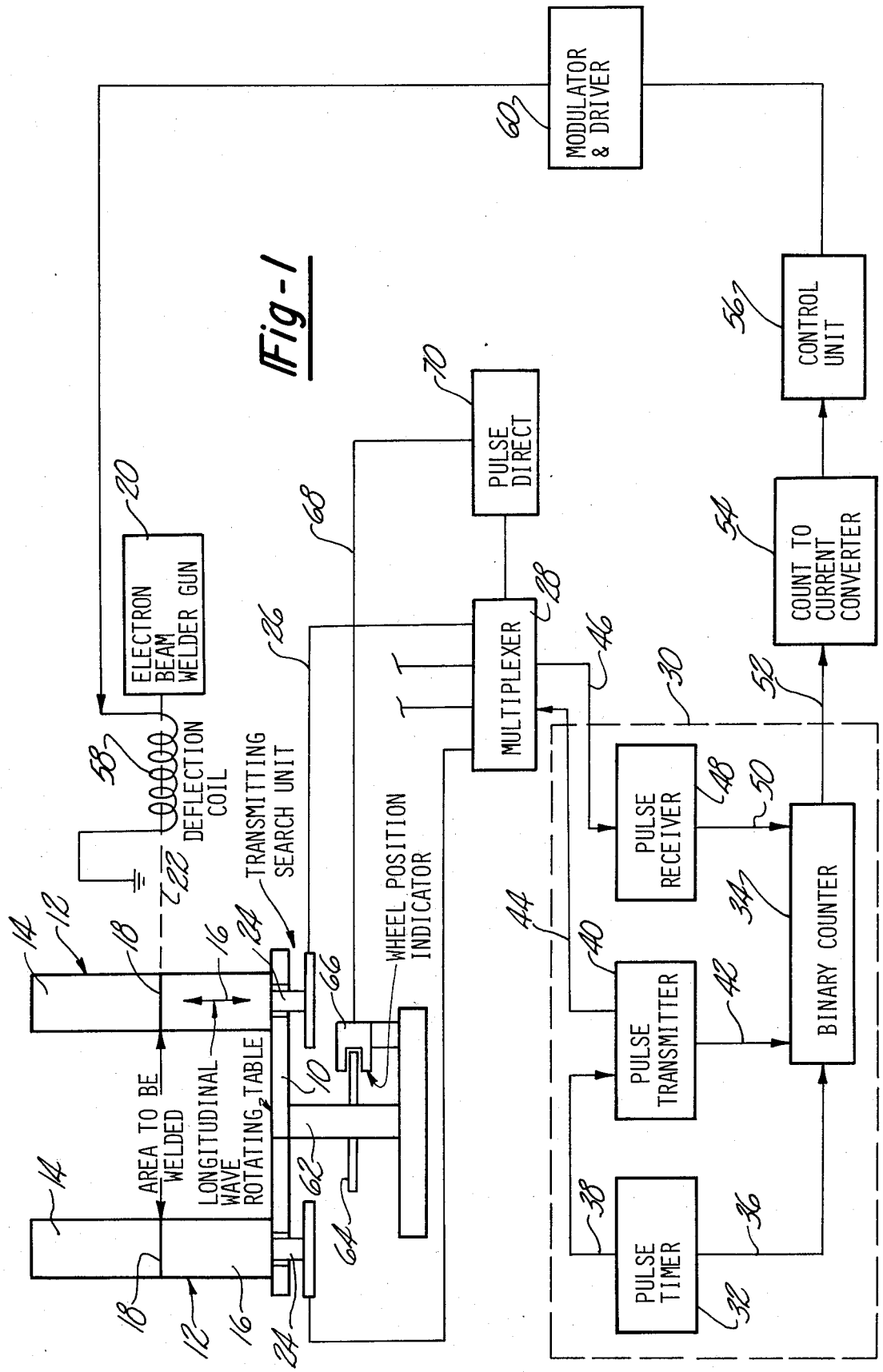
FIG. 1 is a block diagrammatic view showing the automatic beam deflecting circuit of the present invention.

Referring now to FIG. 1, a work table 10 is shown supporting a plurality of work pieces 12. In the example shown, each work 12 comprises an upper cylinder 14 and a lower cylinder 16, so that an interface 18 is created at the junction of the cylinders 14 and 16. The cylinders 14 and 16 are intended to be welded together and for this purpose an electron beam welder gun 20 is provided to emit an electron beam 22 at the interface 18. Since the distance between the work table 10 and the interface 18, i.e. the axial length of the cylinder 16, may vary from work piece 12 to work piece 12, the distance between the work table 10 and the interface 18 must first be determined and the welder gun 20 must be effectively re-aimed in accordance with this determination.

To this end, a search unit 24, such as a Sperry Reflectroscope Type VM-721, is secured to the work table 10 axially below the cylinder 16. The search unit 24 serves a two fold function. First, the search unit 24 is adapted to generate a sense wave pulse longitudinally along the cylinder 16, and secondly, the search unit 24 receives the echo of the sense wave pulse from the interface 18. Since the sense wave pulse travels at a known speed, preferably approximately the speed of sound, the elapsed time between the generation of the wave pulse and the receipt of the echo from the interface 18 is representative of the distance between the work table 10 and the interface 18.

In order to measure the elapsed time, the input/output line 26 from the search unit 24, is fed through a multiplexer 28, which operation will be subsequently described in detail, to a timing circuit 30. The timing circuit 30 comprises a pulse timer 32 which feeds a clock signal at a predetermined frequency to the input of a binary counter 34 along line 36 so that the counter 34 counts the number of oscillations from the timer 32 in the well known manner. Upon command, the pulse counter 32 generates a pulse along line 38 to a pulse transmitter 40. The pulse transmitter 40 then simultaneously generates a pulse along line 42 to reset the binary counter 34 to zero and a pulse along line 44, through the multiplexer 28, and to the search unit 24. The search unit 24 in response to the signal from the pulse transmitter 40 generates a sense wave pulse longitudinally along the cylinder 16.

The sense wave pulse is reflected by the interface 18 and the echo produced by this reflection is sensed by the search unit 24 which in response thereto generates an output signal along line 26, through the multiplexer 28, and along line 46 to a pulse receiver 48. Upon receipt of the signal from the search unit, the pulse receiver 48 generates a signal on its output line 50 to disable, or stop, the counter 34. Since the counter 34 was reset to zero by the pulse transmitter 40 upon the generation of the sense wave pulse, and disabled upon receipt of the interface echo by the pulse receiver 48, the count in the counter is representative of the elapsed time between the generation of the sense wave pulse and the receipt of the echo from the interface 18. Analogously, since the propagation speed of sense wave pulse is known, the count in the counter is representative of the distance between the search unit 24, and hence the work table 10, and the interface 18.

The output from the binary counter 34 is fed along line 52 to a count-to-current converter 54 and a preprogrammed control unit 56 which, in combination, determine in accordance with the count in the counter 24, the amount of current required by a deflection coil 58 magnetically coupled with the electron beam 22 to deflect the beam to the interface 18. A modulator/driver 60 is of course interposed between the deflection coil 58 and the control unit 56 to establish the proper magnetic field in the deflection coil 58 in response to electrical signals from the control unit 56. In practice, it has been found that the control unit 56 may be easily and accurately programmed to control the deflection of the electron beam 22 to within 1/1000 of an inch. It is apparent that as thus far described the present invention provides a novel apparatus for rapidly, accurately, and automatically positioning the beam from an electron beam welder for each individual work piece 12.

Improvements to the present invention, are, of course, possible. For example, in the preferred form of the invention, the work table 10 is supported by a shaft 62 and rotatable around a vertical axis. A plurality of work pieces 12 are supported by the table 10 and each work piece 12 includes an associated search unit 24 disposed axially underneath the work piece 12. An annular flange 64 is secured to the shaft 62 and encoded so that a position indicator 66 associated with the flange 64, transmits an output signal along line 68 representative of the rotational position of the table 10 to a pulse director 70. The pulse director 70 in turn controls the multiplexer 28 so that the proper search unit 24 is coupled by the multiplexer 28 to the timing circuit 30. Although virtually any number of work pieces 12 can be supported on the work table 10, in practice it has been found that four work pieces 12 may be practically carried by the table 10 at any given time.

Figure 2:
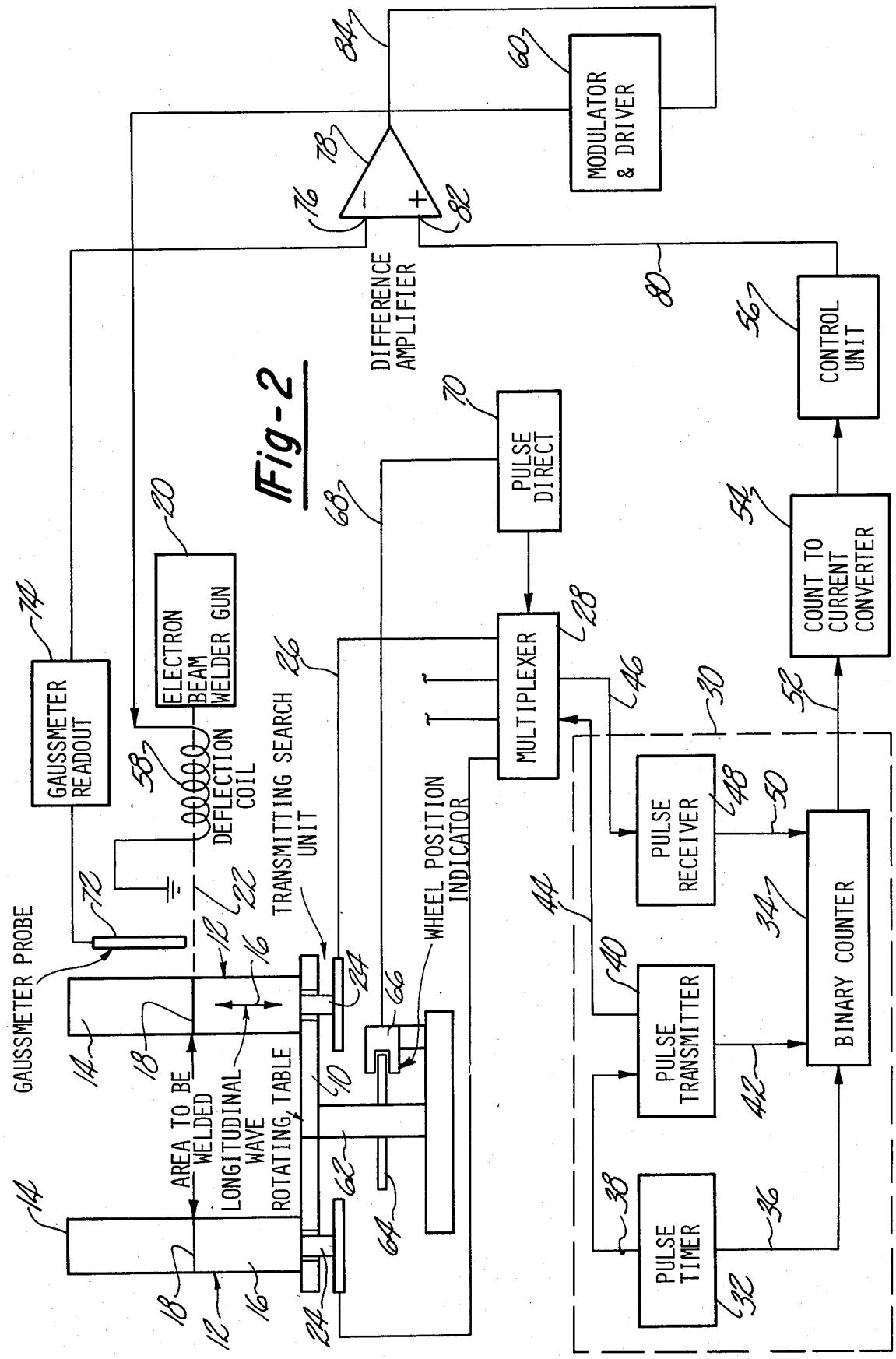
FIG. 2 is a block diagrammatic view of the present invention similar to FIG. 1, but showing a modification thereof.

A still further modification to the present invention is illustrated in FIG. 2. FIG. 2 illustrates a closed loop system of the electron beam deflecting circuit of the present invention. More specifically, a gaussmeter probe 72 is positioned adjacent the electron beam 22. The electron beam 22 is, in essence, electric current which generates a magnetic field in the well known manner. This magnetic field is detected by the probe 72 and fed through a gaussmeter readout 74 to the negative input 76 of a differential amplifier 78. It will be appreciated that the output from the gaussmeter readout 74 will vary as the electron beam 22 is deflected so that the gaussmeter readout 74 is indicative of the actual position of the electron beam 22. The output 80 from the control unit 56 is fed to the positive input 82 of the differential amplifier 78 while the error output 84 from the amplifier 78 is fed to the modulator/driver 60. In this manner, the error output 84, rather than the output from the control unit 56, controls the current which ultimately reaches the deflection coil 58.

The error output 84 thus generally comprises the difference between the output from the binary counter 34 and the output from the gaussmeter readout 74 which is calibrated in absolute position above the rotating table 10 so that when the binary counter 34 indicates the position of the interface 18, the electron beam 22 will be deflected until its position as sensed by the probe 72 equals that indicated by the binary counter 34. Preferrably the electron beam 22 location will be continuously updated to account for thermal expansion and the like, and of course, provisions will be made in the converter 54 to maintain the beam 22 in its last position until the updated information from the counter 34 is completed. It has been found that with the closed loop system shown in FIG. 2, extremely accurate electron beam welding may be accomplished.

It can thus be seen that the present invention provides a new and novel apparatus for automatically deflecting the electron beam from an electron beam welder. No unnecessary limitations, however, should be drawn from the description thus far provided. For example, it is obvious that the present invention is readily adaptable to a wide variety of different types of work pieces. Moreover, although the interface 18 has received the welding operation in the disclosure thus far, it should be apparent that the welding operation may commence at any given reference distance from the interface 18 while remaining within the scope of the present invention.

Still further modifications of the present invention will become apparent to those skilled in the art to which it pertains without deviating the spirit of the invention as defined by the scope of the appended claims.

We claim:

1. For use in conjunction with a workpiece positioned on a work table, said workpiece having a substantially planar interface spaced from the work table, an apparatus for welding said interface comprising:
   sounding means operatively coupled at one end of said workpiece for generating an ultrasonic sense wave pulse along said workpiece to said interface;
   receiving means operatively coupled at the lastmentioned end of said workpiece for receiving an echo of said sense wave from the interface in said workpiece;
   an electron beam welding gun adapted to generate an electron welding beam toward said workpiece, wherein said electron beam is substantially parallel to said interface and substantially perpendicular to the path of said sense wave;
   timing means for determining the elapsed time between the generation of said sense wave pulse by said sounding means and the receipt of said echo by said receiving means, wherein said elapsed time is representative of the distance from said work table to said interface;
   means responsive to said elapsed time determined by said timing means for deflecting the electron beam in a direction substantially parallel to said path of the sense wave so that said electron beam impinges upon said interface and welds the same.

2. The invention as defined in claim 1, wherein said last mentioned means comprises a deflection coil magnetically coupled with said electron beam so that said beam is deflected as current flows through said coil.

3. The invention as defined in claim 1, wherein said timing means further comprises:
   a binary counter,
   a clock having its output fed into said counter,
   means for resetting said counter upon the generation of said sense wave, and
   means for stopping said counter upon the receipt of said echo by said receiving means so that the count in said counter is representative of the elapsed time.

4. The invention as defined in claim 1, wherein said timing means further comprises:
   a counter,
   a clock coupled to the input of said counter,
   means for starting said counter upon the generation of said sense wave, and
   means for stopping said counter upon the receipt of said echo by said receiving means so that the count in said counter is representative of the elapsed time.

5. The invention as defined in claim 1 and including feedback means for indicating the position of said machine operation, said feedback means being operable to modify said last-mentioned means for controlling the position of impingement of said electron beam.

6. The invention as defined in claim 5, wherein said feedback means comprises a gaussmeter probe.

7. The invention as defined in claim 1, wherein said work table is rotatable and adapted to support a plurality of work pieces thereon so that rotation of the work table functions to move one of said work pieces into position for said machine operation, said apparatus further comprising:

sounding means and receiving means associated with each of said work pieces, indicating means for producing a signal indicative of the rotational position of said work table, and multiplexing means responsive to said signal from said indicating means for selectively connecting one of said sounding means and one of said receiving means to said timing means.

* * * * *

UNITED STATES PATENT AND TRADEMARK OFFICE
CERTIFICATE OF CORRECTION

PATENT NO. : 4,278,866
DATED : July 14, 1981
INVENTOR(S) : Glenn T. Nevins and William A. Keely It is certified that error appears in the above-identified patent and that said Letters Patent are hereby corrected as shown below:

Column 3, line 63, delete "errably" and insert --erably-- therefor.

Signed and Sealed this

Twentieth Day of October 1981

[SEAL]

Attest:

GERALD J. MOSSINGHOFF

Attesting Officer      Commissioner of Patents and Trademarks